Nov. 14, 1950 L. H. BROWNE 2,529,996
EPICYCLIC DRIVE
Filed Feb. 12, 1946 5 Sheets-Sheet 1

INVENTOR.
LINDSAY H. BROWNE
BY
ATTORNEYS

Nov. 14, 1950      L. H. BROWNE      2,529,996
EPICYCLIC DRIVE
Filed Feb. 12, 1946      5 Sheets—Sheet 3
Fig. 3
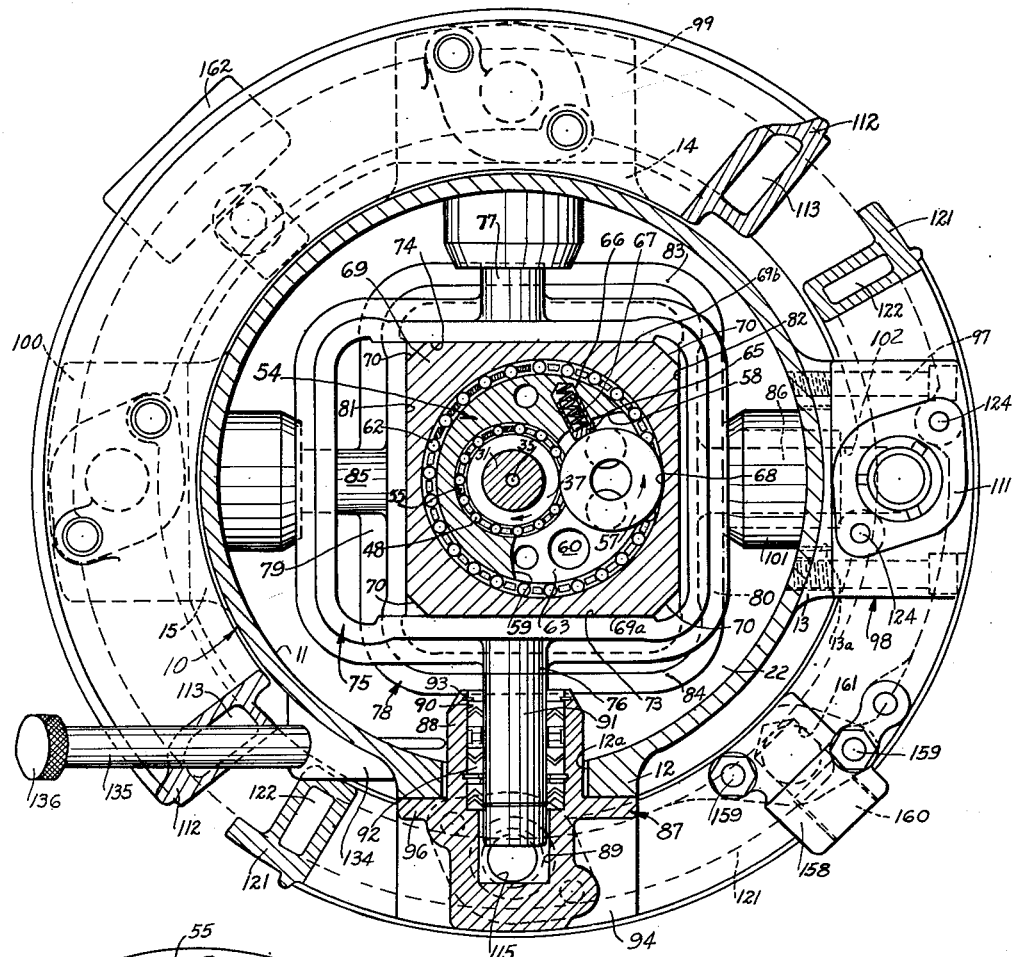
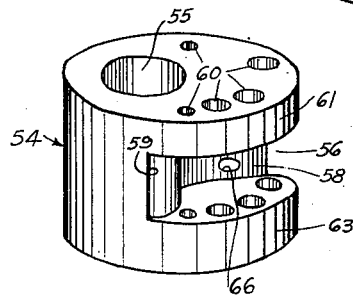
Fig. 6
INVENTOR.
LINDSAY H. BROWNE
BY *Van Deventer + Grier*
ATTORNEYS Nov. 14, 1950 — L. H. BROWNE — 2,529,996
EPICYCLIC DRIVE
Filed Feb. 12, 1946 — 5 Sheets-Sheet 4

INVENTOR.
LINDSAY H. BROWNE
BY
ATTORNEYS

Nov. 14, 1950  L. H. BROWNE  2,529,996
EPICYCLIC DRIVE

Filed Feb. 12, 1946  5 Sheets-Sheet 5

INVENTOR
LINDSAY H. BROWNE
BY
Van Deventer + Grier
ATTORNEYS

Patented Nov. 14, 1950

2,529,996

UNITED STATES PATENT OFFICE 2,529,996

EPICYCLIC DRIVE

Lindsay H. Browne, Westport, Conn., assignor to American Brake Shoe Company, a corporation of Delaware Application February 12, 1946, Serial No. 647,078

17 Claims. (Cl. 74—50)

This invention relates to improvements in epicyclic drives and has for an object the provision in an epicyclic drive of a drive member carrying an outwardly facing race, a driven member having an inwardly facing race, roller means between said races, and means urging said roller means into rolling contact with both said races.

Another object of the invention is the provision in an epicyclic drive of a drive member carrying an outwardly facing race, a driven member having an inwardly facing race, roller means between said races, a filler block disposed between said races, said filler block contacting both said races with the exception of the area occupied by said roller means and clearance areas on each side thereof, and spring means carried by said filler block and urging said roller means into rolling contact with both said races.

Yet another object of the invention is the provision in a drive of the character described wherein frictionless bearings are provided between said filler block and said inner race and between said filler block and said outer race.

A further object of the invention is the provision in an epicyclic drive of counter-balancing means carried on one element of said drive and disposed substantially diametrically opposite the roller means.

Yet another object of the invention is the provision in an epicyclic drive of means carrying inner and outer races facing each other, roller means contacting said races, a filler block between said races and clearing said roller means, and counter-balancing means mounted on said filler block and disposed substantially diametrically opposite said roller means.

Another object of the invention is the provision in a reciprocating device of an epicyclic drive which includes an inwardly facing outer race, said outer race being formed in a block member constituting a portion of a scotch yoke movement.

Yet another object of the invention is the provision in a multi cylinder pump of an epicyclic drive, the oscillating member of which carries a plurality of pivoted connecting rods and at least one rigid connecting rod.

This application is a continuation, in part, of Application Serial Number 503,241, filed September 21, 1943, now Pat. #2,427,253, dated Sept. 9th, 1947.

Referring to the drawings, which are given by way of example to illustrate the invention:

Figure 3 is a sectional view taken on the lines 3—3 of Figure 2;

Figure 6 is a perspective view of the filler block or camming member;

Figure 2:
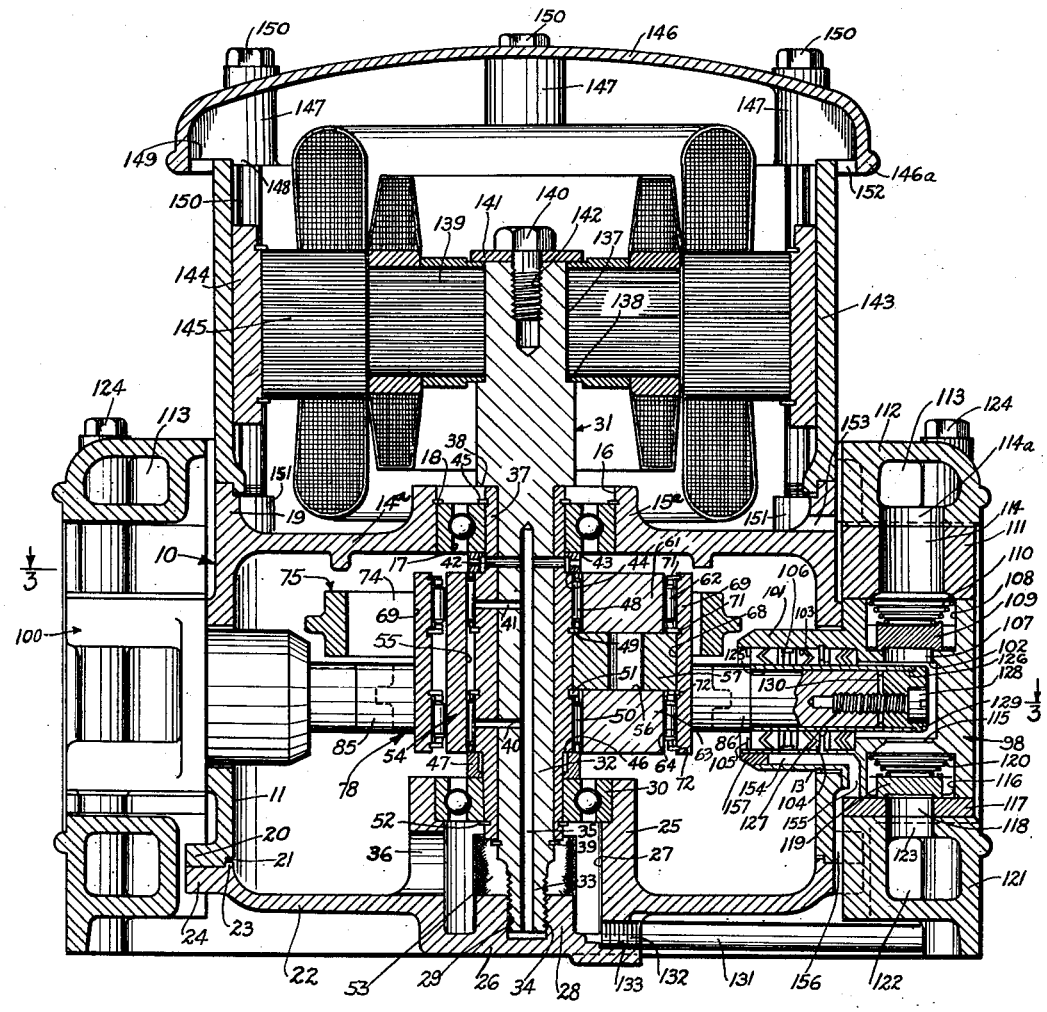
Figure 2 is a sectional elevation of the unit shown in Figure 1.

Referring first to Figures 2 and 3, a casing 10 has a circular side wall 11 carrying a plurality of bosses 12, 13, 14, and 15. Each boss has a radial hole like the radial hole 12a shown in Figure 3. The bosses, it will be noted, are oppositely disposed, and center lines adjoining opposite holes cross each other along the vertical center line of the casing.

The casing 10 has upper wall 14a preferably formed integral therewith, and carrying a boss 15a. The boss 15a has a central bore 16 into which the outer race of a ball bearing 17, is pressed. The bearing is retained in the bore 16 by means of a spring ring 18, the outer periphery of which engages a groove formed in the bore 16. The casing 10 also has an upwardly extending stepped rim 19, the purpose of which will be presently described. The casing 10 carries on its bottom end an outwardly extending radial flange 20 which is stepped at 21.

Secured to the bottom of the casing 10 is a bottom end plate 22 which carries a bead 23 which cooperates with the step 21, and a flange portion 24 which contacts the annular flange 20 on the casing 10.

The end plate 22 has centrally located thereon an upstanding boss 25 and a depending boss 26 preferably in alignment therewith. The boss 25 has a bore 27 formed therein and in the interior of this bore is formed a boss 28 having a sump bore 29 formed therein. At the upper end the bore 27 is counterbored to accommodate the outer race of a ball bearing 30, said counterbore forming a shoulder against which the bottom end of the outer race may rest as the top end is flush with the upper end of the boss 25.

A vertical shaft 31 has a portion 32 of reduced diameter, the lower end 33 of which is still smaller in diameter, and which is approximately one to two thousandths of an inch smaller in diameter than the diameter of the bore 29. The portion 33 also has threads 34 formed thereon. A central hole 35 is formed in the shaft 31 and extends upwardly therein to a point adjacent the ball bearing 17. The threads 34 are formed of such hand (right hand or left hand) that when the shaft 31 is rotating in its operative direction, oil, in the lower portion of the casing and within the bore 27, is forced up the hole 35 in the shaft and is delivered to points which will be presently described.

An opening 36 formed in the boss 25 as shown, permits the lubricant to pass from the bottom of the casing into the bore 27.

Mounted on the portion 32 of the shaft is a sleeve 37, the upper end of which abuts the shoulder 38 formed on the shaft 31, and the lower end of which abuts a spring ring 39 formed near the lower end of the shaft portion 32. This sleeve is preferably keyed to the shaft portion 32, and formed in the sleeve and the portion 32 are matched holes or passages 40, 41, and 42. The passages 40 and 41 are radial, and the passage 42 is diametrical, and these passages are provided for delivering lubricant from the hole or passage 35 previously described. The upper end of the sleeve 37 is stepped to accommodate the inner race of the ball bearing 17 and a ring member 43, the latter of which rests on a shoulder 44 formed on the sleeve 37. A spring retaining ring 45 has its inner periphery engaging a groove formed in the sleeve 37, near the upper end thereof, and the web of the spring ring overlies the member of the ball bearing carrying the inner race. The lower end of the sleeve 37 is also of reduced diameter and a shoulder is formed at 46. An annular ring 47 engages the shoulder 46 and also engages the member carrying the inner race of the ball bearing 30. Below this member is a spring ring 52 which engages said member and has its inner periphery engaging a groove formed in the sleeve 37 adjacent to its lower end.

Mounted on the sleeve adjacent to the shoulder 44 is a needle bearing 48, the race of which is between the ring member 43 and a spring ring 49, the inner periphery of which engages a groove formed in the sleeve 37. Spaced apart from the needle bearing 48 on the sleeve 37, is a second needle bearing 50. The lower end of the race of the needle bearing 50 abuts the ring 47 and its upper end is engaged by a spring ring 51, the inner periphery of which engages a groove formed in the sleeve 37 in spaced relation to the groove engaged by the spring ring 49.

Embracing the boss 28, and extending upwardly to a point adjacent to the lower surface of the ball bearing 30, is a screen 53 which serves to strain all of the oil delivered to the bore 35 in the shaft.

Now referring to Figure 3, the needle bearings 48 and 50 support a filler block or camming member generally designated by the numeral 54, and shown in perspective in Figure 6. The interior bore 55 of this camming member forms the outer races for the needle bearings 48 and 50. The camming member 54 is slotted at 56 to accommodate a roller 57, the purpose of which will be presently described. The slot 56 terminates, as can be seen in Figure 3, in a curved wall 58 adjacent to the normal operating position of the roller 57. On the other hand, the slot 56 terminates in a curved wall 59. The camming member 54 also has a plurality of longitudinal holes 60 formed therein parallel to the axis of the bore 55 in order to lighten the rotating structure. Above the slotted portion 56, carrying the roller 57, is a solid portion 61, which as may be seen in Figure 2, forms the inner race of a roller bearing 62. Below the slot 56 is a solid portion 63 which cooperates to form the inner race of a roller bearing 64.

Within the body of the camming member 54, and extending through the surface 58, is a plunger 65 which is reciprocally mounted in a hole 66 formed in the camming member 54 and which is hollowed out to accommodate a spring 67 which urges the plunger 65 into contact with the roller 57 thereby tending to urge the latter into engagement with both the sleeve 37, and into contact with the interior bore 68 of a scotch yoke member 69, to be presently described. Above the roller 57 the bore 68 forms the outer race of the roller bearing 62, and below the roller 57 the bore 68 forms the outer race of the needle bearing 64.

The member 69 is in the form of a square block with beveled corners 70, and the bore 68 above referred to is concentric with the center of the square. The length of the member 69 is substantially the same as that of the length of the camming member 54. In order to retain the roller bearing 62 therein, spring rings 71, the outer peripheries of which engage grooves formed in the bore 68, are provided at each end of the roller bearing. Likewise spring rings 72 at each end of the roller bearing 64 engage similar grooves formed in the bore 68.

Engaging the flat surfaces 69a, 69b of the member 69 are machined pads 73 and 74 respectively formed in a yoke member 75. The opening formed in the yoke member is rectangular to permit the yoke member to move laterally therein as shown in Figure 3. In other words, vertically the space between the pads 73 and 74 is the same as the distance across flats of the square, while the distance horizontally or laterally, as seen in Figure 3, is greater than the distance across flats by the length of the stroke (eccentricity of the path of movement of the square), plus sufficient clearance. Formed integral with the yoke 75 is a rod 76 preferably centrally disposed with respect to the lateral sides of the yoke. The yoke also carries oppositely disposed to the rod 76, a second rod 77. The yoke 78 has sides 79 and 80 which respectively carry pads 81 and 82, which form a working fit with the vertical sides of the member 69. The yoke 78 also has sides 83 and 84 which are spaced apart from one another a distance equal to the distance across the square sides of the member 69, plus the stroke of the epicyclic movement, plus sufficient clearance.

Preferably formed integral with the side 79, of the yoke 78, is a rod 85. This rod preferably lies on a horizontal center line extending through the yoke 78. The side 80, of the yoke 78, also has preferably formed integral therewith a rod 86 in alignment with the rod 85.

Figure 1:
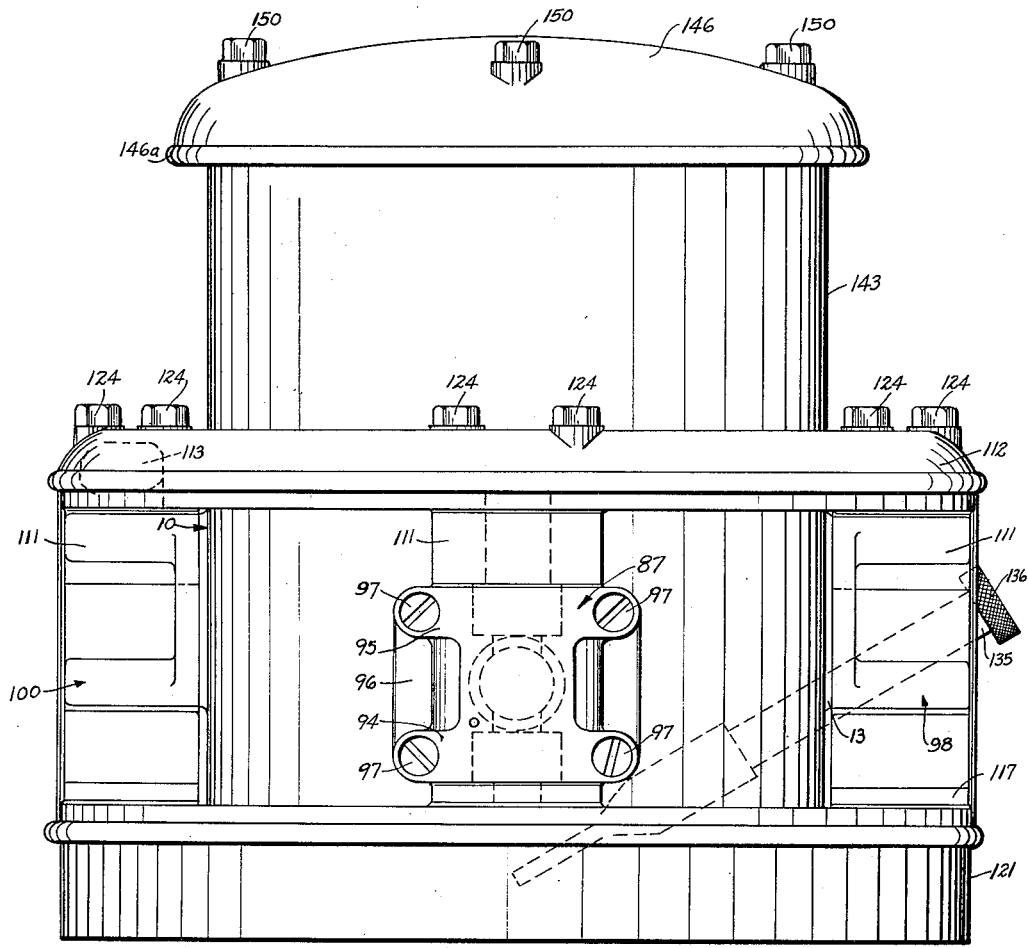
Figure 1 is an elevation showing a motor-driven liquid pump and employing an improved form of my epicyclic drive.

Mounted on the boss 12 is a cylinder member 87 having a tubular portion 88 extending through the bore 12a. The cylinder member 87 has an interior bore 89 and a counter bore 90. The bore 89 forms clearance for the piston 91, and within the space between the counter bore 90 and the piston 91 is a series of packing rings 92. These packing rings are secured in the cylinder by means of a spring ring 93, the outer periphery of which engages a groove formed in the wall of the counter bore 90. The cylinder member 87 includes a lower horizontal flange 94, an upper horizontal flange 95, and a vertical flange portion 96 which abuts the outer face of the boss 12. The cylinder member 87 is secured to the boss 12 by means of four filister head cap screws 97, as may be seen in Figure 1.

Returning to Figure 3, a cylinder member 98 is mounted on the boss 13, and has a tubular portion 101 which extends through the radial bore 13a formed in the boss 13. The cylinder member has a bore 102, like the bore 89, with sufficient clearance for the piston, to be presently described. The cylinder member 98 also (referring now to Figure 2), has a counter bore 103 which accommodates a series of packing rings 104, said series being retained in the counter bore 103 by means of a spring ring 105, the outer periphery of which engages a groove formed in said bore. Amid the packing rings 104 is a lantern ring 106, to be presently described. All of the cylinder members are identical, and although the following details are included in all of them, these details may only be seen in Figure 2, of the drawings. A hole 107, extending vertically downward, and communicating with the cylinder bore 102 is counterbored at 108, and the shoulder formed between the counterbore 108 and the bore 107 forms a seat for a valve member 109. This valve member forms the discharge valve for the cylinder of the member 98. Positioned within the counterbore 108 is a spring member 110, the lower end of which abuts the valve member 109, and the upper end of which is in contact with the lower end of an intermediate member 111 for leading the discharge fluid from the cylinder to the discharge manifold 112. The latter includes an annular fluid passage 113, with branch passages, such as the one shown at 114a, for communicating with the interiors of the tubular members, such as the member 111.

The cylinder member 98 also has a vertical hole 115, which is counterbored at 116 to form a valve chamber. Abutting the lower face of the cylinder member 98, is a valve seat ring 117, which is provided with a hole 118. The upper surface of the plate 117 forms a seat for a valve member 119. A spring 120 has its leading end engaging the upper surface of the valve 119, and its upper end bottoms in the counterbore 116, thereby urging the valve 119 downwardly on its seat. This valve forms the inlet valve for the cylinder. Secured to the cylinder member 98, and the plate 117, is a manifold 121. This manifold has an annular passage 122 formed therein, and a cross passage 123 formed therein communicates with the passage 122, and with the hole 118. The manifold 112, and the intermediate member 111 are secured to the cylinder member 98 by means of hexagon head cap screws 124, as may be seen in Figures 1, 2, and 3. Likewise, the manifold 121, and the valve 117 are secured to the lower portion of the cylinder member 98 by means of filister head screws (not shown extending upwardly from the bottom of the device).

The rod 86 is reduced in diameter at 125 to accommodate a sleeve 126. The rod 86 has a central tapped hole 127 formed therein, and this hole is engaged by a cap screw 128 extending through a piston head member 129. By means of the screw 128, the ends of the sleeve 126 may be secured in fluid tight relation to the shoulders abutting the ends thereof. Between the piston head 129 and the rod 86 packing 130 may be provided for perfecting a fluid tight seal. As the yoke member 78 is moved on a horizontal path by means of my improved epicyclic movement, the piston is reciprocated in the cylinder bore 102. Whenever it moves toward the left, as seen in Figure 2, the suction created allows the valve 119 to lift so that water, for example, may enter this cylinder. As soon as the piston starts moving to the right, as seen in Figure 2, the pressure created, abetted by the urge of the spring 120, seats the valve 119, and as the pressure builds up in the cylinder, the valve 109 is displaced against the urge of its spring 110, and thereby fluid (water) discharged from the cylinder may pass via said last mentioned valve, a passage 114 in said intermediate member, and thence to the passage 113 in the manifold 112.

When the piston is moving on its suction stroke, which is toward the left, as seen in Figure 2, the discharge valve 109 is held on its seat under the urge of the spring 110, and the partial vacuum created in the cylinder causes fluid from the manifold 122 to flow via passages 123 and 118, and to lift the valve 119 off of its seat against the urge of the spring 120. The fluid then passes via the inlet port 115, and into the cylinder, filling the same as the stroke to the left progresses. Now as the piston starts moving to the right again, the dischare action described above is repeated. A cylinder member 99, like the cylinder members 87 and 98, is mounted on the boss 14, and the fourth cylinder 100, is mounted on the boss 15.

The rod 85 oppositely disposed with respect to the rod 86, on the yoke 78, is formed into a piston in the same manner as described for the rod 86, and as the yoke 78 is reciprocated due to the epicyclic movement in the block 69, the pistons on the rods 85 and 86 move in unison so that when the piston on the rod 86 is on a discharge stroke, the piston on the rod 85 is on a suction stroke.

The rod 76, on the yoke 75, has its piston 91 constructed in the same manner as the one described on the rod 86, and likewise a similar piston is carried on the rod 77. The pistons on the rods 76 and 77 likewise move in unison as the block 69 reciprocates so that when the piston on the rod 76 is making a suction stroke, the piston on the rod 77 is making a discharge stroke. Passages in the intermediate member 111, like the passage 114, and passages in the manifold 112 (like the passage 114a), lead from each of the cylinders 87, 99, and 100, and communicate with the passage 113 in the manifold 112 in the same manner as shown in Figure 2. Between the passage 122 in the inlet manifold 121, and all of the cylinders, are passages such as 123 and 118, shown and described in connection with the cylinder 98.

As the shaft 31 (Figure 3) rotates in a clockwise direction, the sleeve 37, which is keyed thereto, also rotates in a clockwise direction, and the roller 57, which is urged into engagement therewith by the spring loaded plunger 65, rolls in a counter-clockwise direction around the surface 68. As the roller rolls around this surface it is constantly interposing itself between the outer surface of the sleeve 37, and the surface 68, thereby causing the block 69, which carries the bore 68, to move with an epicyclic movement. The block 69 drives both the yoke 75 and the yoke 78 as scotch yokes.

When the device is operating, the thread 29 on the lower end of the shaft urges oil downwardly between itself and the wall of the passage 34. The oil then passes through the hole 35 and is delivered to the working parts via the branch passages 40, 41, and 42. The screen, or strainer, 53, is positioned between the passage 36 and the threaded impeller screw 29, and therefore the oil is strained repetitively so that no unstrained oil may be delivered to the impeller screw 29. The pistons receive oil discharged centrifugally from the cross-hole 42. A plug 131 has threads 132 engaging a threaded hole 133 at the bottom of the sump 27. A boss 134 formed on the casing 10, has a hole formed therein communicating with the interior of the casing, and mounted in this hole is a filler tube 135 carrying a screw cap 136. The oil may be drained from the interior of the casing by removing the drain plug 131, and this may be replaced and fresh oil added to the crank case via the filler tube 135 after the cap 136 has been removed.

Although the shaft 31 may be driven in any suitable manner, I prefer to drive it with an electric motor. The upper end of the shaft may have a turned down portion 137 formed thereon providing a shoulder 138, and an electric rotor 139 may be pressed on the reduced portion 137 and against the shoulder 138, and secured in this relation by means of a cap screw 140 passing through a washer 141, and engaging a threaded hole 142 formed in the upper end of the shaft 31. A tubular member 143 has mounted therein a ring 144 into which is pressed the stator 145, and the laminations of this stator are in proper alignment with the laminations of the rotor 139.

A dome member 146 has a plurality of bosses 147 formed therein. These bosses are stepped as shown so that a portion, 148 extends within the open end of the tubular member 143, and a portion 149 bears against the end thereof. Bolts 150, passing through the bosses 147 engage threaded holes in bosses 151 formed in the upper portion of the casing 10, and thereby secure the stator and the tubular member 143 onto the casing 10. An annular space 152 appears between the rim 146a of the dome and the upper end of the tubular member 143 (except where the bosses 147 appear), and thereby a space for air circulation is provided. A vent 153 formed in the upper end of the casing 10 is provided for excess oil to drain from the motor housing.

The lantern ring 106 positioned intermediate the packing rings above referred to is provided to prevent any water, which leaks past the pistons, from entering the interior of the casing 10, and likewise prevents any oil which leaks past the pistons and is possibly co-mingled with the water from entering the interior of the chamber 10. A passage 154, formed in the cylinder 98 communicates with the lantern ring and with a cross passage 155, and the latter in turn communicates with a groove 156 formed in the boss 13. The left end of the passage 154 is provided with a plug 157 so that no oil or water can pass into the interior of the casing 10, and therefore it must flow into the passage 155 and thence downwardly through the groove 156 to the exterior.

A fitting 158 secured to the intake manifold 121 by means of screws 159 has a passage 160 formed therein which communicates with the interior 122 of said manifold via a cross passage 161. A similar fitting 162, mounted on the manifold 112, communicates with the passage 113 therein, and this fitting may be led to the point of use. The device herein shown and described is an automobile washer, and water under pressure from the outlet 162 is used for this purpose.

It will be noted that if the shaft 31 is rotated in the wrong direction, for example, in a counter-clockwise direction, as viewed in Figure 3, the roller 57 is urged in a clockwise direction, and the roller reacts against the spring loaded plunger 65 and tends to move to a point where the space between the shaft and the surface 68 is greater than the diameter of the roller with the result that the epicyclic movement will not operate unless driven by a shaft rotating in a clockwise direction. If the reverse were required, obviously the member 54 could be withdrawn, turned end for end, and replaced, thereby setting the device up to operate in the opposite direction. However, in either event, the device is arranged so that it will only operate in one direction, not in both.

Figure 4:
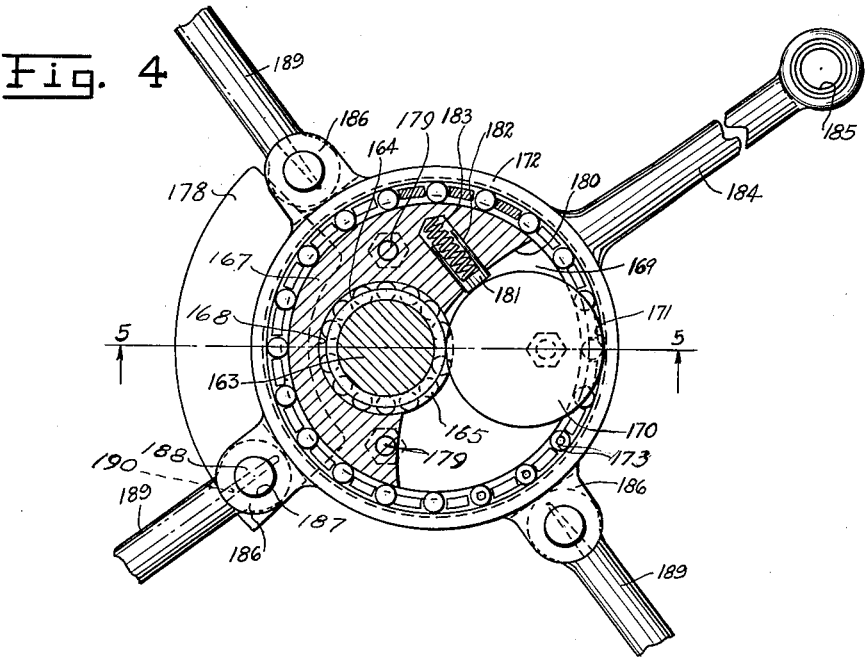
Figure 4 is an end view of a modified form of the epicyclic drive shown in Figure 3.
Figure 5:
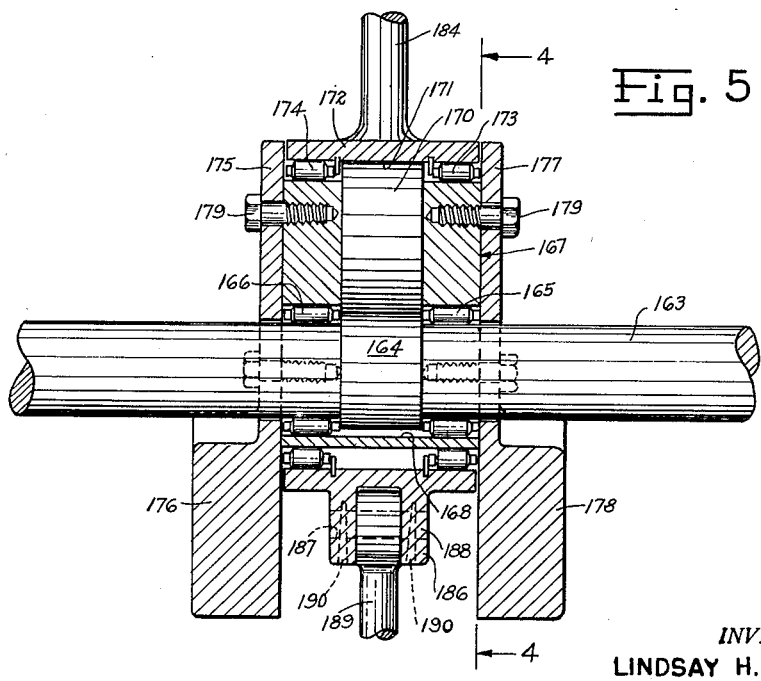
Figure 5 is a sectional view taken along the line 5—5 of Figure 4.

In the arrangement shown in Figures 4 and 5, a shaft 163 has a race portion 164 formed thereon. On the shaft, to one side of the race 164, is a roller bearing 165, and a second roller bearing 166 is positioned on shaft 163 to the other side of the race 164. A filler block or camming member 167 has a bore 168 which forms the outer race for the bearings 165, 166. The filler block has a hollowed-out portion 169 to clear a roller 170. This roller is urged into rolling contact with the race 164, and into contact with the bore 171 formed in a yoke member 172. Between the exterior surfaces of the filler block 167, on either side of the roller 170, are roller bearings 173 and 174. The exterior surface of the filler block 167 form the inner races of the bearings 173 and 174, and the interior bore 171 forms the outer races of these bearings.

A disc-like member 175 is secured to the left end of the filler block 167, as seen in Figure 5, and this disc-like member overlaps the left end of the yoke member 172. Formed integral with the disc-like member 175 is a counter-balancing weight 176. A second disc-like member 177 is secured to the right end of the filler block 167, and it likewise has formed integral therewith a counter-balancing weight 178. These disc-like members are secured to the filler block by means of cap screws 179, and the weights 176 and 178 are positioned somewhat opposite to the cut-out portion carrying the roller 170. Projecting from the curved wall 180, of the cavity 169, is a plunger 181 mounted in a hole 182 formed in the filler block 167, and a spring 183 also mounted in said hole, urges the plunger 180 into engagement with the roller 170 with the result that the roller 170 is in turn urged into rolling engagement with the race 164 and the bore 171. The yoke 172 may have formed integral therewith a connecting arm 184, the outer end of which may carry a suitable bearing 185. The yoke may also carry a plurality of pairs of spaced lugs 186 which may be best seen in Figure 5. These lugs have a cross hole 187 formed therein to accommodate a wrist pin 188, which passes through a bearing formed in a connecting rod 189. The wrist pin is pushed through one of the lugs and then through the bearing in the connecting rod 189, and thence into the other lug, and may be secured therein by means of taper pins 190, or in any other suitable manner. I have found that the movement described in Figures 4 and 5 operates at high speed with substantially no vibration.

In the form of the invention shown in Figure 2, the weight of the filler block or camming member 54 is carried by the roller 57, and the roller member is supported in the member 69 by means of a spring ring 51 snapped into a groove formed in the sleeve member 37. The member 69 is supported on the roller 57 by means of the lower spring ring 71, and the roller in turn is supported on the shaft (sleeve 37 which is secured to the shaft) by means of the spring ring 51.

Figure 7:
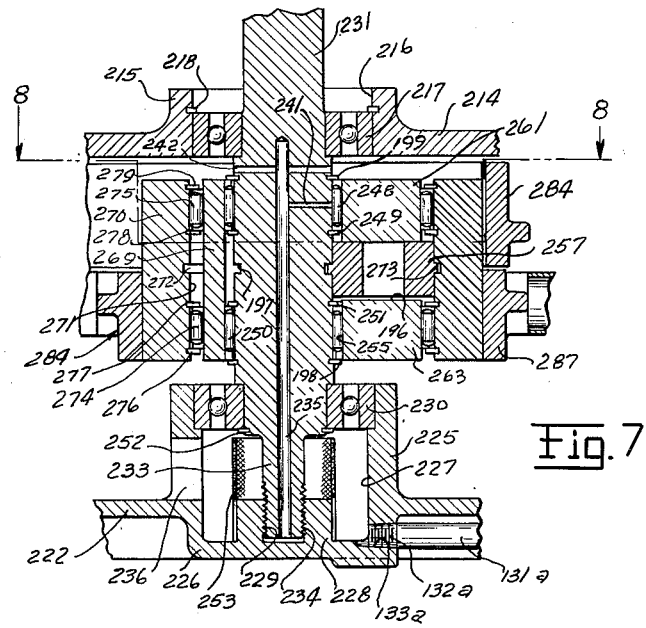
Figure 7 is a fragmentary sectional elevation, showing a modification of the invention wherein the roller member is provided with an annular flange which engages corresponding grooves formed in the inner and outer races.
Figure 8:
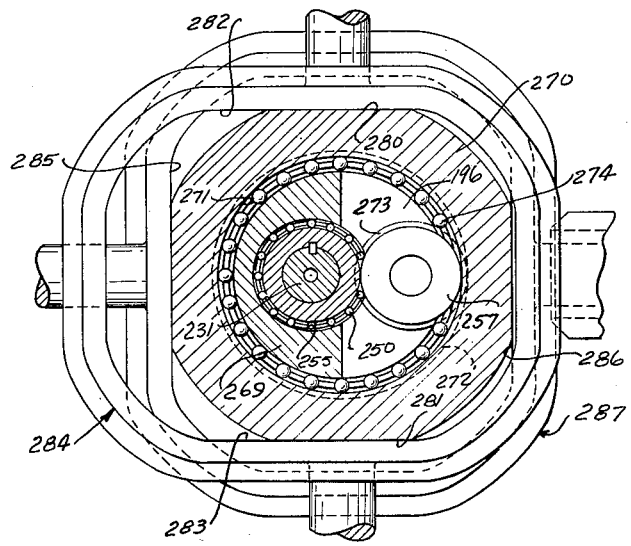
Figure 8 is a plan view taken along the line 8—8 of Figure 7.

In the modification shown in Figures 7 and 8, the roller is provided with an annular flange which engages corresponding grooves formed in the inner race and in the outer race. Referring to said figures, a shaft 231 corresponding to the shaft 31 in Figure 2, is provided with a ball bearing 217 mounted in a bore 216 formed in a boss 215 on the end plate 214. The ball bearing is retained in the bore 216 by means of a spring ring 218 snapped into a groove formed in the bore 216. The shaft 231 is also supported near its lower end on a ball bearing 230, the outer race of which fits a bore formed in the boss 225 and rests on a shoulder formed in said boss. The inner race of the ball bearing 230 is retained on the shaft by means of a spring ring 252 snapped into a groove in the shaft. A roller bearing 248 and a roller bearing 250 spaced apart therefrom are retained on the shaft 231 by spring rings 249, 251, 199 and 198. The shaft 231 also has a groove 197 formed therein.

The filler block or camming member 269 has a bore 255 which cooperates with and forms outer races for the roller bearings 248 and 250. A slot 196 is formed in the camming member 269 intermediate the ends thereof and extends from the periphery to the center line as shown in Figure 8, thereby leaving semi-circular sections 261 and 263 between which the roller 257 is positioned.

A scotch yoke member 270 has an internal bore 271 which has a groove 272 formed intermediate the ends thereof. This groove is in alignment with the groove 197 and both said grooves are engaged by an annular flange 273 formed on the roller 257.

The bore 271 forms an outer race for roller bearings 274 and 275. The outer surface of the filler block and camming member cooperates with these bearings to form inner races. The roller bearing 274 is retained in the bore 271 by means of spring rings 276 and 277 which are snapped into grooves formed in the yoke member 270. Likewise the bearing 275 is retained therein by means of spring rings 278 and 279 snapped into corresponding grooves formed in the yoke member 270. The yoke member 270 is provided with opposite flat surfaces 280 and 281, which cooperate with the surfaces 282 and 283 respectively of a yoke 284, which is similar to the yoke 75 shown in Figure 3.

The member 270 also has opposed flat surfaces which cooperate with surfaces 285 and 286 formed in the yoke member 287.

The end plate 222 has centrally located thereon an upstanding boss 225 and a depending boss 226 in alignment therewith. The boss 225 has a bore 227 formed therein and in the interior of this bore is formed a boss 228 having a sump bore 229 formed therein. At the upper end of the bore 227 is a ball bearing 230 mounted in a counter bore.

The shaft 231 has a lower end 233 of reduced diameter and which is approximately one to two thousandths of an inch smaller in diameter than the diameter of the bore 229. The portion 233 also has threads 234 formed thereon. A central hole 235 is formed in the shaft and extends upwardly therein to a point adjacent the ball bearing 217. The threads 234 are formed of such hand (right or left hand) that when the shaft 231 is rotating in its operative direction, oil, in the lower portion of the casing and within the bore 227, is forced up the hole 235 in the shaft and is delivered to points which will presently be described.

An opening 236 formed in the boss 225 as shown permits the lubricant to pass from the bottom of the casing into the bore 227. A diametrical passage 242 extends through the shaft 231 and communicates with the vertical hole 235 in the shaft, so that when oil is forced up the passage 235 it passes out of both ends of the passage 242 and lubricates the needle bearings, the roller, the camming member, the member 270, and the yoke members 284 and 287. If desired, I may form additional passages such as the passage 241 to individually lubricate the inner needle bearings.

Embracing the boss 228 and extending upwardly to a point adjacent to the lower surface of the ball bearing 230 is a screen 253 which serves to strain all of the oil delivered to the bore 235 in the shaft.

A plug 131a has threads 132a engaging a threaded hole 133a at the bottom of the sump 227, and to drain the oil from the interior of the casing the plug 131a, which is of such length that it extends beyond the perimeter of the casing, may be removed.

Although I have herein shown and described by way of example one embodiment of the invention, and modifications thereof, it is obvious that many changes may be made in the arrangements herein shown and described without departing from the spirit of the invention as set forth in the following claims:

What is claimed is:

1. In an epicyclic drive, a rotatable shaft, an inner race on said shaft, a member adapted to be gyrated, said member including an inwardly facing outer race, a roller member between said races, a filler block between said races and having its outer surface parallel to said outer race and its inner surface parallel to said inner race, a cavity formed in said filler block to clear said roller, and spring loaded means carried on said filler block and urging said roller member into rolling engagement with said races.

2. In an epicyclic drive, a rotatable shaft, an inner race on said shaft, a member adapted to be gyrated at less strokes per minute than the number of revolutions of said shaft, said member having an interior bore formed therein at least a portion of which constitutes an outer race, a roller member between said races, a filler block between said races and having a cavity formed therein clearing said roller member, said filler block having its outer surface parallel to said outer race and having an eccentric hole formed therein the inner surface of which is parallel to said inner race, and spring loaded means carried in said filler block and extending through a wall of said cavity to engage and urge said roller member into rolling engagement with said races.

3. In an epicyclic drive, a rotatable shaft carrying an outwardly facing inner race, a hollow member having an interior bore at least a portion of which forms an inwardly facing outer race, a single roller between said races, tubular eccentric means between and engaging both said shaft and said member for holding said races in eccentric relation to one another, said tubular eccentric means having a portion intermediate the ends thereof removed to clear said roller and spring means carried by said last mentioned means and engaging said roller for urging the same into rolling contact with both said races.

4. In an epicyclic drive, a rotatable shaft carrying an outwardly facing inner race, a hollow member having an interior bore a portion of which forms an inwardly facing outer race, a single roller between said races, a filler block between said shaft and said member having an external bearing surface facing said bore and having an interior bearing surface eccentric to said bearing surface and facing said shaft, said filler block also having a portion cut away to form a clearance for said roller, and spring loaded means mounted in said filler block and peripherally engaging said roller for urging the latter into rolling contact with both said races.

5. In an epicyclic drive, a rotatable shaft carrying an outwardly facing inner race, a hollow member having an interior bore forming an inwardly facing outer race, said hollow member having at least two oppositely disposed flat surfaces, a single roller between and adapted to rollingly engage said races, a filler block between said shaft and said member having an external bearing surface facing said bore, and having an interior surface eccentric to said bearing surface and facing said shaft, said filler block also having a cut-away portion clearing said roller, frictionless bearing means between said shaft and said interior bearing surface, other frictionless bearing means between said external bearing surface and said bore, and spring loaded means mounted in said filler block and peripherally engaging said roller for urging the latter into rolling contact with both said races.

6. In an epicyclic drive, a support, a rotatable shaft journaled in said support, an outwardly facing inner race surface carried by said shaft, a hollow member having an interior bore forming an inwardly facing outer race surface, a filler block member having a second outwardly facing inner race surface smaller in diameter than the diameter of said first outer race surface and a second inwardly facing outer race surface eccentric to said second inner race surface, facing and spaced apart from said first outwardly facing inner race surface carried by said shaft, said race surfaces being conjointly engaged by antifriction means for maintaining predetermined fixed relations between said shaft, said hollow member, and said filler block, a single roller rollingly engaging said first mentioned outwardly facing inner race and said interior bore for transmitting motion from said shaft to said hollow member, a clearance cavity formed in said filler block and extending inwardly from the outer surface thereof, and spring means carried by said filler block for maintaining said roller in said rolling engagement.

7. In an epicyclic drive, a support, a rotatable shaft journaled in said support and on outwardly facing inner race surface carried by said shaft, a hollow member having an interior bore forming an inwardly facing outer race surface, a filler block member having a second outwardly facing inner race surface smaller in diameter than the diameter of said first outer race surface, and a second inwardly facing outer race surface eccentric to said second inner race surface, facing and spaced apart from said first outwardly facing inner race surface carried by said shaft, frictionless bearing means cooperating with at least portions of said race surfaces for maintaining predetermined fixed relations between said shaft, said hollow member, and said filler block, said bearing means lying within and adjacent to the ends of said hollow member, roller means in rolling engagement with said first mentioned outwardly facing inner race and said first mentioned inwardly facing outer race surfaces for transmitting motion from said shaft to said hollow member, a clearance cavity formed in said filler block and extending inwardly from the outer surface thereof to clear said roller means, and spring means carried by said filler block for maintaining said roller means in said rolling engagement.

8. In an epicyclic drive, a support, a rotatable shaft journaled in said support and an outwardly facing inner race surface carried by said shaft, a rectangular hollow member having an interior forming an inwardly facing outer race surface, a filler block member having a second outwardly facing inner race surface smaller in diameter than the diameter of said first outer race surface, and a second inwardly facing outer race surface eccentric to said second inner race surface, facing and spaced apart from said first outwardly facing inner race surface carried by said shaft, frictionless bearing means cooperating with at least portions of said race surfaces for maintaining predetermined fixed relations between said shaft, said hollow member, and said filler block, said bearing means lying within and adjacent to the ends of said hollow member, roller means in rolling engagement with said first mentioned outwardly facing inner race and said first mentioned inwardly facing outer race surfaces for transmitting motion from said shaft to said hollow member, said roller means being positioned within a clearance cavity formed in said filler block intermediate the ends thereof, and spring means carried by said filler block and constantly urging said roller means into said rolling engagement.

9. The invention according to claim 5, in which a yoke member having oppositely disposed inwardly facing bearing surfaces engaging opposite faces of said hollow member is moved thereby as said shaft is rotated, and in which said yoke member carries oppositely disposed aligned pistons, the center lines of which lie on a plane equidistant from said surfaces.

10. The invention according to claim 5, in which said filler block comprises a solid unitary structure having its thicker portion intermediate the ends thereof cut away to form a cavity clearing said roller, and in which said spring loaded means is comprised of a spring loaded plunger positioned in a hole in said member terminating in the wall on said cavity.

11. In an epicyclic drive, a rotatable shaft carrying an outwardly facing inner race, a hollow member having an interior bore at least a portion of which forms an inwardly facing outer race, a single roller between said races, eccentric sleeve means having a clearance slot formed therein at right angles to the axis thereof and extending inwardly from the point of greatest eccentricity and communicating with the interior of said sleeve means between said shaft and said member for holding said races in eccentric relation to one another, said roller being positioned within said clearance slot, spring means carried by said eccentric sleeve means and engaging said roller for urging the same into rolling contact with both said races, and counter-balancing members secured to said last mentioned means and including weights disposed opposite said roller to counterbalance said drive.

12. In an epicyclic drive, a rotatable shaft carrying an outwardly facing inner race, a hollow member having an interior bore a portion of which forms an inwardly facing outer race, a single roller between said races, a filler block between said shaft and said member having an external bearing surface facing said bore and having an interior bearing surface eccentric to said bearing surface and facing said shaft, said filler block also having a portion cut away to form a clearance for said roller, spring loaded means mounted in said filler block and peripherally engaging said roller for urging the latter into rolling contact with both said races, said hollow member being tubular in form, a rigid arm having one end formed integral with said hollow member and carrying a wrist pin bearing on its other end, and lugs angularly disposed on said hollow member and adapted to be connected to objects to be moved thereby.

13. The invention according to claim 5, in which said hollow member is tubular in form and having a rigid arm formed integral therewith, and in which spaced pairs of lugs are angularly disposed about the periphery of said member.

14. The invention according to claim 5, in which said filler block is a few thousandths of an inch longer than said member to provide clearance spaces between the ends of said hollow member and plate members mentioned hereinafter, in which plate members having clearance holes for said shaft are secured to said filler block, said plate members having portions on the opposite side of the shaft from said rolling member, thickened portions constituting counter-weights.

15. In an epicyclic drive, a rotatable shaft carrying an outwardly facing inner race, a hollow member to be gyrated and having an interior bore at least a portion of which forms an inwardly facing outer race, a single roller between said races, eccentric sleeve means between said shaft and said member for holding said races in eccentric relation to one another, said sleeve means having a clearance cavity formed therein to accommodate said roller, and spring means carried by said sleeve means and acting against said roller for urging the same into rolling contact with both said races.

16. In an epicyclic drive, a rotatable shaft carrying an outwardly facing inner race, a hollow member having an interior bore at least a portion of which forms an inwardly facing outer race, a single roller between said races, eccentric tubular means between said shaft and said member for holding said races in eccentric relation to one another, a clearance cavity formed in said tubular means to contain said roller, and counterbalancing members secured to said last mentioned means and including weights disposed opposite said roller to counter-balance said drive.

17. In an epicyclic drive, a rotatable shaft carrying an outwardly facing inner race, a hollow member having an interior bore at least a portion of which forms an inwardly facing outer race, a single roller between said races, eccentric tubular means between said shaft and said member for maintaining said races in eccentric relation to one another, said tubular means having a clearance space formed therein to clear said roller and extending from the side wall thereof of greatest eccentricity toward and communicating with the interior thereof, spring loaded means carried by said eccentric tubular means and engaging and urging said roller into rolling contact with both said races, and counter-balancing members secured to said last mentioned means and including weights disposed opposite said roller to counter-balance said drive.

LINDSAY H. BROWNE.

REFERENCES CITED

The following references are of record in the file of this patent:

UNITED STATES PATENTS

| Number | Name | Date |
| --- | --- | --- |
| 1,029,075 | Lockwood | June 11, 1912 |
| 1,056,746 | Pitts | Mar. 14, 1913 |
| 1,557,193 | Buvinger et al. | Oct. 13, 1925 |
| 1,568,290 | Morison | Jan. 5, 1926 |
| 1,634,507 | Morison | July 5, 1927 |
| 1,863,667 | Miranda | June 21, 1932 |
| 1,867,981 | Mudd | July 19, 1932 |
| 1,868,498 | Gruman | July 26, 1932 |
| 2,164,294 | Maham | June 27, 1939 |